United States Patent

[11] 3,585,400

| [72] | Inventor | Jack L. Brayton |
| | | Newington, Conn. |
| [21] | Appl. No. | 783,295 |
| [22] | Filed | Dec. 12, 1968 |
| [45] | Patented | June 15, 1971 |
| [73] | Assignee | Gosh Instruments, Inc. |
| | | West Hartford, Conn. |

[54] ELECTRICAL FREQUENCY DETECTING DEVICE AND METHOD
28 Claims, 2 Drawing Figs.

[52] U.S. Cl. ................................................. 307/233,
307/283, 328/141, 331/111
[51] Int. Cl. ..................................................... H03k 9/06
[50] Field of Search........................................... 331/111;
307/228, 233, 283; 328/109, 134, 138, 140, 141, 139

[56] References Cited
UNITED STATES PATENTS

| 2,892,101 | 6/1959 | Bright............................ | 307/228 |
| 3,033,994 | 5/1962 | Futimoto....................... | 307/228 |
| 3,099,800 | 7/1963 | Vinson et al.................. | 328/138 X |
| 3,138,759 | 6/1964 | Thompson..................... | 328/140 |
| 3,189,844 | 6/1965 | Mackenzie .................... | 307/228 X |
| 3,305,732 | 2/1967 | Grossman et al. ............ | 328/138 X |
| 3,320,434 | 5/1967 | Ott................................. | 328/140 X |
| 3,448,408 | 6/1969 | Wapner et al. ............... | 328/140 X |
| 3,314,014 | 4/1967 | Perkins.......................... | 328/141 X |
| 3,448,402 | 6/1969 | Booker et al. ................ | 328/134 X |
| 3,502,904 | 3/1970 | Burdonard .................... | 307/233 |

Primary Examiner—John S. Heyman
Attorney—McCormick, Paulding & Huber

ABSTRACT: An electrical device and method for determining whether a plurality of input pulses occur at a repetition rate which is above or below a given reference rate involves the use of a timing means in the form of a capacitor timing circuit which is discharged by each input pulse and which is charged to a predetermined triggering level and produces output pulses if such input pulses do not occur at or above the reference rate. A wave-to-pulse converter is connected with the input of the basic device to adapt it for use in determining the frequency of input signals in the form of sine waves, square waves or other cyclical waves other than pulses. A flip-flop and an AND or NAND gate may be connected to the output of the basic device to produce output pulses when the input signal has a frequency or pulse repetition gate greater than the reference frequency or rate, and two units may be combined to produce a band detector for determining whether the input signal has a frequency or pulse repetition rate falling within a given band.

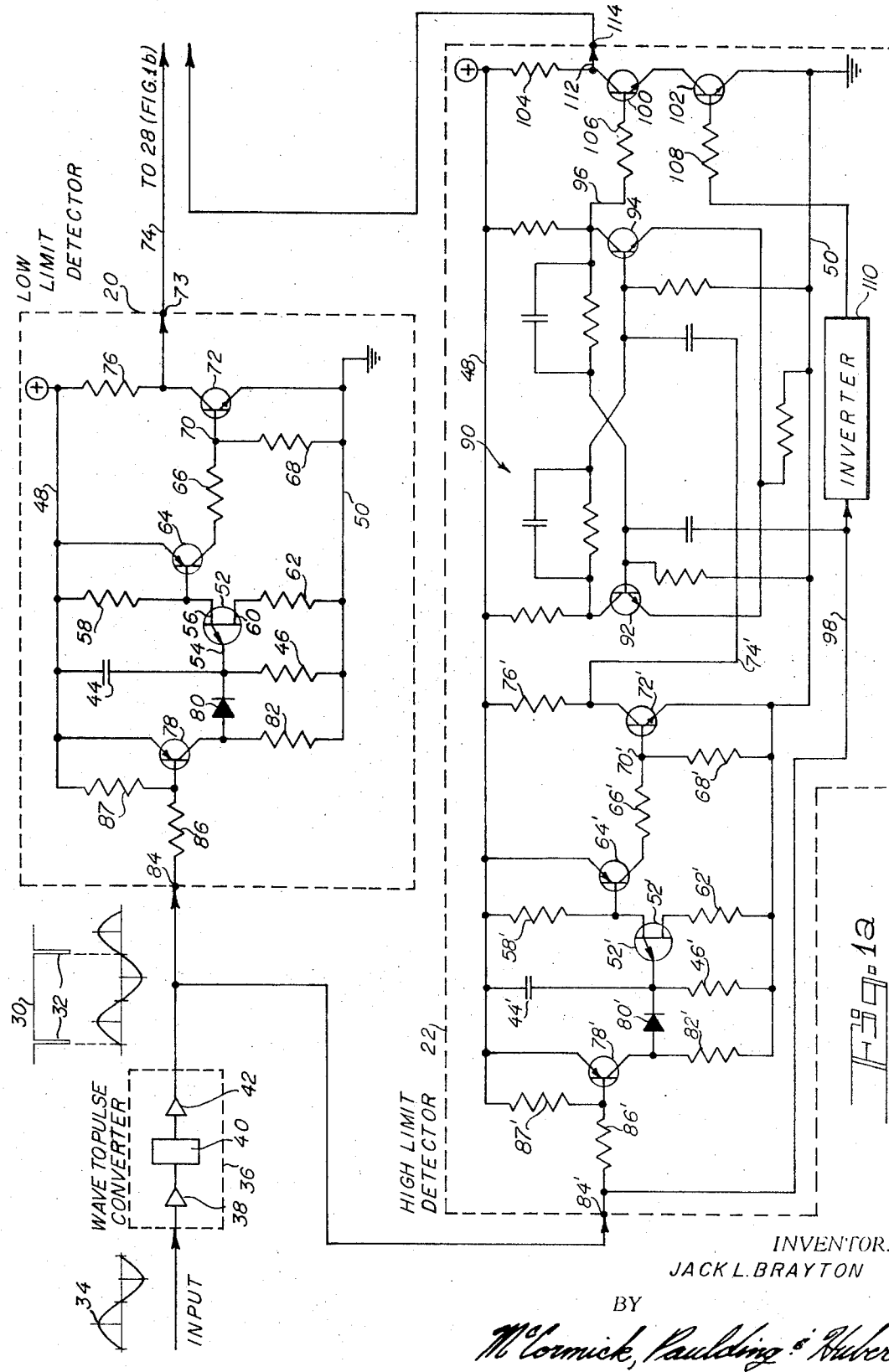

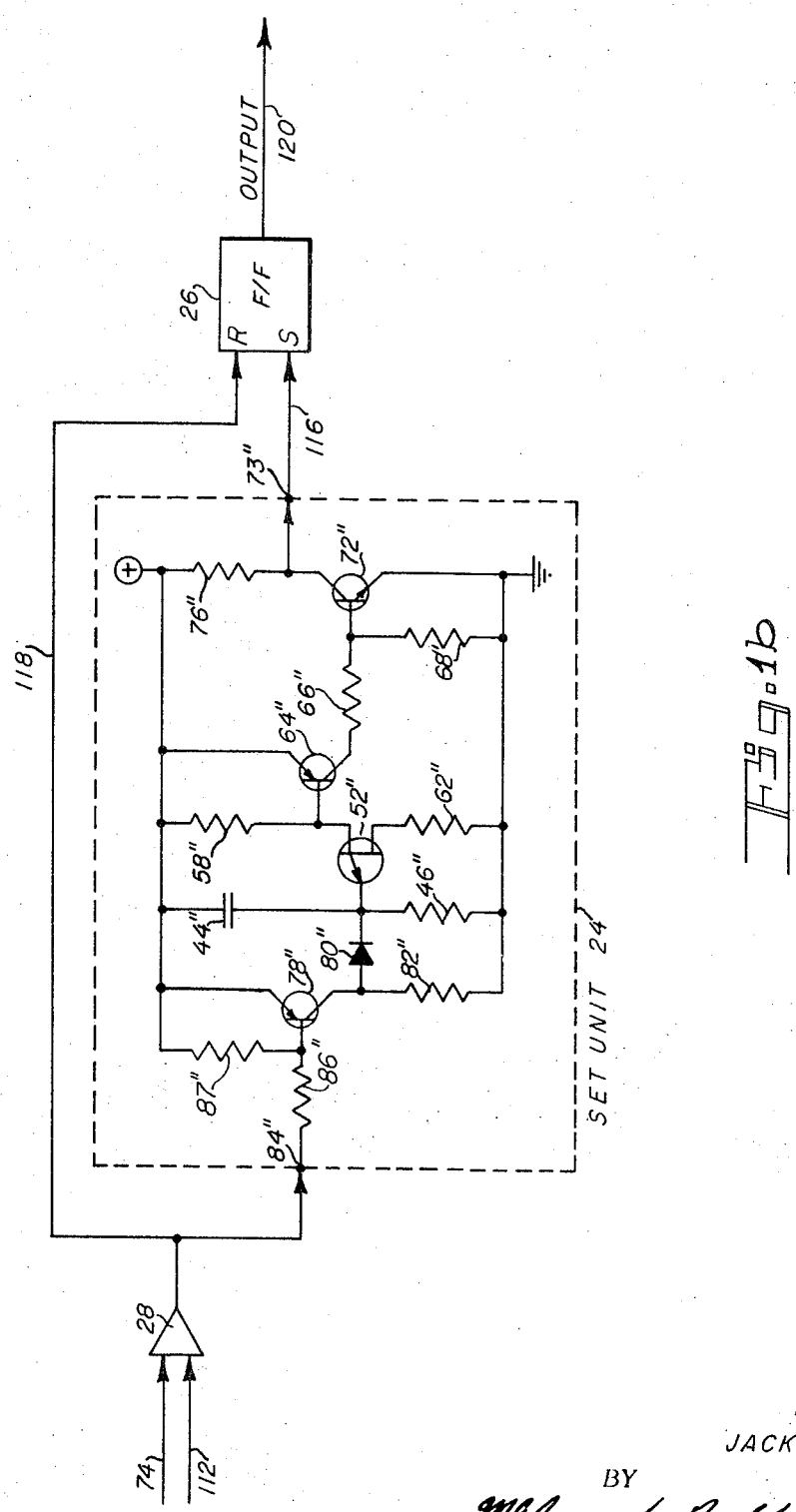

ELECTRICAL FREQUENCY DETECTING DEVICE AND METHOD

BACKGROUND OF THE INVENTION

This invention relates to frequency detecting devices and methods for determining whether a given electrical input signal has a frequency or pulse repetition rate above or below a given predetermined reference value and for producing an output signal indicative of the determination made thereby and which may be used by an associated computer, controller, recorder or the like; and deals more particularly with such a device and method which is capable of accurately detecting frequencies within the audio range.

The frequency detecting device and method of this invention may be put to various different uses, but it is particularly advantageous for use in connection with data transmission systems wherein a bit of information is represented by the appearance or nonappearance of a signal of a given frequency. For example, in a binary system four different frequencies could be assigned to the four places of a four-place binary word, with the appearance or nonappearance at a given time of the frequency assigned to one place determining whether the integer of such place is a one or a zero. The device of this invention because of its accurate discrimination between different frequency signals allows much narrower frequency spacing between different assigned signal frequencies than has heretofore been possible and, because of this ability to accurately detect such closely spaced frequencies permits the use of a higher base than two, as has heretofore been common. For example a base of 10 or 100 may be used for numbers and a base of 26 for letters. Therefore, with a limited available frequency band, such as may be available for example when transmitting over a conventional telephone line or when using a magnetic tape device, the device of this invention may be used to greatly increase the speed of computer data transmission by using a higher base which requires fewer time periods for each digit or letter. Also, speedier transmission is achieved because the receiver is "self-synchronizing," which means no time is required to transmit a zero. For example, if the transmitter and receiver have a 12 digit capacity but only a three-digit number is to be transmitted, only the three-digit time is required for the transmission. These two features greatly increase the equivalent transmission speeds within a restricted bandwidth such as is available with conventional telephone lines or within a magnetic tape device.

The device of the invention is also one which will not respond to harmonics or subharmonics of a given assigned signal frequency, and is also one which is very stable with extreme temperature changes.

SUMMARY OF THE INVENTION

The invention resides in an electrical device in the nature of a Go No-Go frequency detector for determining whether a given input signal has a frequency above or below a given predetermined reference frequency or pulse repetition rate. The basic detecting device is adapted to detect the pulse repetition rate of an input signal consisting of a plurality of relatively narrow pulses, however, if the input signal consists of a sine wave, square wave or other cyclical waveform rather than pulses a suitable wave-to-pulse converter may be employed in conjunction with the basic detecting circuit to convert such input signal to pulses occurring at a pulse repetition rate equal to the frequency of the signal. The basic detecting circuit includes a timing means having a predetermined timing interval and operable to produce an output signal upon the running or timing-out of the timing interval, the timing means being adapted to run when no input pulse appears and being reset to an initial condition to start a new timing cycle upon the appearance of each input pulse. This timing means may be a capacitor which is charged through a resistance and discharged in response to the receipt of each input pulse. A unijunction transistor is connected with the capacitor and is switched to a conducting state to produce an output signal whenever the voltage across the capacitor reaches a predetermined triggering value. The values of the various components are such that the predetermined triggering voltage is reached during a charging period equal to the period between input pulses occurring at the desired reference rate of repetition. Therefore, when output signals are produced by the unijunction transistor these signals are an indication that the repetition rate or frequency of the input signal is below the reference value, and the absence of such signals is an indication that the input signal has a frequency or repetition rate above the reference value.

The invention also resides in adding an additional circuit to the basic detecting device for producing output pulses whenever the basic device produces no output pulses so that the receipt of output pulses from the additional circuit indicates that the input signal frequency is above the reference frequency or repetition rate of the basic device and to produce no output signal when the input signal frequency is below the reference value, thereby producing a device complementary to the basic device. Invention still further resides in combining a basic detecting device with a complementary device and other components, to provide a band detector for determining whether the input signal has a frequency or rate of repetition falling within a given frequency or rate of repetition band and for producing appropriate output signals indicative of the determination.

The invention also resides in the method of frequency detection utilizing a timing means having a predetermined timing interval and involving the control of such timing means by input pulses, the frequency of which is to be determined, in such a manner that the timing interval of the timing means is set to an initial state upon the appearance of each pulse and started to run at the end of each pulse. When and if the timing interval times out between pulses an output signal is produced to indicate that the input pulses occur at a rate lower than the reference rate established by the timing interval of the timing means.

BRIEF DESCRIPTION OF THE DRAWINGS

FIG. 1a and FIG. 1b when taken together and arranged side by side with FIG. 1a on the left and FIG. 1b on the right form a single figure comprising a schematic wiring diagram of a device embodying this invention.

DESCRIPTION OF THE PREFERRED EMBODIMENT

Turning to FIG. 1a and 1b the single figure produced by placing these figures side by side with FIG. 1a on the left and FIG. 1b on the right constitutes a wiring diagram showing this invention as embodied in a device for detecting whether a given electrical input signal has a frequency falling within a given frequency band and for producing an output signal representative of the determination made thereby. This band detector is comprised essentially of a basic detector used as a low limit detector 20, a complementary detector used as a high limit detector 22, a set or automatic one circuit 24, an output flip-flop 26, and a mixing amplifier or OR gate 28. The low and high limit detectors 20 and 22 are both responsive to input signals, such as shown at 30, consisting of a series of narrow pulses 32, 32 having negative going leading edges. In some instances the input signal transmitted from a remote source to the band detector may actually be in the form of pulses such as shown at 32, 32 in which case the input signal may be fed directly to the low and high limit detectors. In most cases, however, and as illustrated, the received signal is in the form of a sine wave, such as indicated at 34, square wave or some other cyclically repetitive waveform other than repetitive narrow pulses, and when this is the case the device includes a circuit such as indicated at 36 for converting the input signal to narrow pulses having a repetition rate equal to the frequency of the input signal. For example, when the input signal has a sinusoidal waveform such as shown at 34, the wave-to-pulse converter 36 may comprise a high gain amplifier 38 for converting the sinusoidal input into essentially a square wave, a one-shot multivibrator 40 connected to the output of the amplifier 38 and operable to produce one narrow pulse on the positive going edge of each square wave, and a buffer amplifier 42 for connecting the output of the one-shot multivibrator 40 to the low and high limit detectors 20 and 22.

The low limit detector 20 of FIGS. 1a and 1b comprises the basic detector unit of this invention. It is essentially a timing means having a predetermined timing interval and which is operable to produce an output signal upon the running or timing-out of such timing interval. It is also adapted to run when no input pulse is applied thereto and to be reset to the beginning of a new timing cycle in response to the appearance of an input pulse. Therefore if the input pulses occur at a repetition rate such that the time interval between them is greater than the timing interval of the timing means, the timing means will time-out during the interpulse intervals and will produce an output signal indicating a pulse repetition rate lower than that established by the timing interval. If the input pulses occur at a repetition rate such that the time interval between them is less than the timing interval, then the timing means will not time-out during the interpulse intervals and no such output signal will be produced. In the illustrated case of the detector 20 the timing means includes a timing capacitor 44 which is charged from a regulated DC source of voltage through a charging resistor 46, the voltage source being represented by a positive line 48 and a ground or 0 voltage line 50 which are connected to a suitable power supply. A detecting circuit is connected with the capacitor 44 for producing an output signal whenever the voltage across the capacitor exceeds a predetermined value, and as shown this circuit comprises a complementary unijunction transistor 52 having its emitter terminal 54 connected to the junction between the capacitor 44 and the resistor 46. The base 1 terminal 56 of the transistor 52 is connected to the positive voltage line 48 through a resistor 58, and its base 2 terminal 60 is connected to the ground line 50 through another resistor 62. Accordingly, it will be obvious that when the voltage across the capacitor 44 rises to the point at which the voltage on the emitter terminal 54 is sufficient to trigger the unijunction transistor 52, the latter will be triggered and will conduct between its emitter terminal 54 and the base 1 terminal 56 thereby discharging the capacitor 44 and producing a voltage pulse at the base 1 terminal 56. As explained in more detail hereinafter the presence of an output pulse or pulses at the base 1 terminal 56 of the unijunction transistor 52 is an indication that the input pulses supplied to the detector 20 occur at too low a rate, that is at a rate below the reference rate.

The pulses appearing at DC base 1 terminal 56 of the unijunction transistor are amplified by a transistor 64 having its base terminal connected to the terminal 56 of the unijunction transistor, having its emitter terminal connected to the positive voltage line 48, and having its collector terminal connected to the ground line 50 through two series connected resistors 66, 68 and through the base and emitter junctions of transistor 72. The pulses produced at the base terminal 56 through the action of the transistor 64 produce amplified pulses at the junction 70 of the two resistors 66 and 68. These amplified pulses at the junction 70 may be used directly as output pulses; however, they are pulses with positive going leading edges (referenced to line 48) and for use with the remainder of the illustrated system it is necessary that the output pulses of the device 20 be pulses with negative going leading edges (referenced to line 50). Therefore the device 20 further includes an additional inverter transistor 72 for converting the positive pulses appearing at the junction 70 to negative pulses appearing at the output line 74, the transistor 72 having its base terminal connected to the ground line 50, and its collector both connected directly to the output terminal 75 and connected to the positive line 48 through a resistor 76.

The basic or low limit detector 20 of the drawing further includes a gated circuit for discharging the timing capacitor 44 in response to the receipt thereby of each of the input pulses 32, 32. The gated circuit includes a transistor 78 having its emitter terminal connected to the positive side of the capacitor 44 and having its collector terminal connected to the negative side of the capacitor through a diode 80. The collector terminal is also connected to the ground line 50 through resistor 82, and the base terminal of the transistor is connected to the input terminal 84 of the detector through a resistor 86 and to the line 48 through a resistor 87. Therefore, it will be apparent that when a negative pulse 32 is applied to the input terminal 84 the transistor 78 is biased to a conducting state during the brief time of such pulse which time is sufficient to allow the capacitor 44 to be discharged to a fully discharged condition. By fully discharged, it is meant that the final value is below the conventional 0.5 volt level assumed for silicon devices. This occurs because the forward leakage of diode 80, even below the 0.5 volt level, is low enough to complete the discharge. Of course, transistor 78 is biased by means of line 48 and line 50, thus its forward drop does not enter into consideration. That is, in the forward conducting state transistor 78 offers a very low dynamic resistance across capacitor 44 (through diode 80). After the pulse 32 disappears the transistor 78 is returned to a nonconducting state; diode 80 is reverse biased; and the capacitor 44 charges through the resistor 46 during the period between such pulse and the next appearing pulse. If this period is such that the capacitor does not achieve a charge during it sufficient to trigger the unijunction transistor 52, then no output pulse will appear at the output terminal 73. By properly selecting and matching the values of the supply voltage, the capacitor 44 and the resistors 46, 58 and 62 to the characteristics of the unijunction transistor 52 the time required to charge the capacitor 44 from its discharged condition to the value required to trigger the unijunction transistor may be set to any predetermined value and corresponding to a desired predetermined pulse repetition rate. The time required to charge the capacitor from its discharged condition to the value required to trigger the unijunction transistor is what is sometimes referred to herein as the timing interval of the detector 20. Accordingly, it will be understood that after the components of the unit are selected or adjusted to give the unit a given reference pulse repetition rate, if the input pulses appearing at the input terminal 84 occur at a rate lower than the reference rate the unijunction 52 will be fired by the charging of the capacitor 44 between input pulses to produce output pulses at the output terminal 73 indicating such low condition of the input pulse repetition rate. On the other hand, if the input pulses occur at a rate higher than the reference rate such pulses will act through the transistor 78 to discharge the capacitor 44 during each input cycle before the voltage across the capacitor has an opportunity to rise to the level responsive to fire the unijunction transistor, and accordingly the unijunction transistor will not be triggered and no output pulses will appear at the output terminal 73, such absence of such pulses therefore indicating that the pulse repetition rate of the input pulses is above the reference rate.

The basic detector 20 of the drawing may in certain applications be used by itself to merely provide an indication of whether a given input signal has a frequency or pulse repetition rate above or below a given value. In the illustrated band detector, however, the basic detector 20 is used to detect whether the input signal has a frequency or pulse repetition rate above or below a given low value, defining the low limit of the band in question, and the complementary detector 22 is used to determine whether the input signal has a frequency or pulse repetition rate above or below a given high value defining the high limit of the band. The right-hand portion of the illustrated complementary or high limit detector is a timing means exactly similar to that of the basic or low limit detector 20 and therefore the parts making up such portion of the high limit detector have been given the same reference numbers as in the low limit detector 20, except for being primed, and need not be further described. An exception to this similarity is however of course that in the low limit detector 20 the capacitor 44 and resistors 36, 58 and 62 are chosen to provide a lower reference pulse repetition rate (or longer timing interval) than that of the high limit detector 22. For example, the low limit detector 20 may be constructed or adjusted to have a reference rate of 10 pulses per second and the high limit detector 20 may be constructed or adjusted to have a reference rate of 12 pulses per second. In addition to the parts which are similar to the parts of the basic or low limit detector 20, the complementary or high limit detector 22 includes a flip-flop, indicated generally at 90, connected with the output line 74'. The flip-flop 90 includes two transistors 92 and 94 and the output signal is taken from the collector terminal of the transistor 94 and appears on the line 96. The operation of the flip-flop 90 is such that when a pulse appears on the line 74', indicating that the input pulses appearing at the input terminal 84' occur at a rate below the associated reference rate, the transistor 94 is switched to a conducting state on the trailing edge of such pulse. The opposite or reset side of the flip-flop 90 is connected to the input terminal 84' of the detector 22 through the line 98 so that each time an input pulse 32 appears at the input terminal 84' the transistor 92 is switched to a conducting state on the trailing edge of such input pulse.

Therefore, if the input pulses applied to the input terminal 84' of the high limit detector 22 occur at a rate below its reference rate, output pulses appear at the output line 74' and at the end of each output pulse the flip-flop 90 is set to a set condition to produce a near zero voltage on the line 96; and shortly thereafter when the next input pulse 32 appears at the input terminal 84' the flip-flop 90 is reset to its reset condition on the trailing edge of the pulse to remove the near zero voltage on the line 96 and to increase such voltage to the positive value of the supply line 48. If the rate at which input pulses appear at the input terminal 84' is above the reference rate of the detector 22 then no output pulses appear on the line 74', the flip-flop 90 remains in a reset condition, and the voltage appearing on the line 96 remains at the positive value of the line 48.

The signals which appear on the line 96 of the detector 22 are supplied to a NAND gate circuit consisting of two transistors 100 and 102. These two transistors are connected in series with one another as shown between the power supply lines 48 and 50, the 100 having its collector terminal connected to the positive line 48 through a resistor 104 and having its emitter terminal directly connected to the collector terminal of the transistor 102, the emitter terminal of the transistor 102 being in turn directly connected to the ground line 50. The flip-flop output line 96 is connected to the base terminal of the transistor 100 through a resistor 106. The base terminal of the transistor 102 also has a resistor 108 connected therewith and the input thereto is an inverted form of the input signal appearing at the input terminal 84', such inverted signal being produced by an inverter 110 connected between the input terminal 84' and the resistor 108. That is, the inverter 110 converts the negative pulses 32, 32 of the input signal appearing at the input terminal 84' to positive pulses occurring simultaneously with such negative input pulses and each of which positive pulses switch transistor 102 to a conducting state.

Considering the operation of the NAND gate formed by the transistors 100 and 102, when a positive voltage appears on line 96 simultaneously with a positive pulse from inverter 110, indicating an input pulse repetition rate above the associated reference rate, transistors 100 and 102 are biased to a conducting state. This produces a current flow through the resistor 104 and therefore a negative output pulse at the collector of the transistor 100 which is transmitted by the line 112 to the output terminal 114 of the detector 22. On the other hand, if a near zero voltage appears on the line 96 simultaneously with a positive pulse from inverter 110, indicating that the repetition rate of the input pulses appearing at the input terminal 84' is below the reference rate, then transistors 100 and 102 will not be biased to a conducting state and no output pulse will appear on the output line 112 or output terminal 114. The net result of all this is that when pulses do appear at the output terminal 114 it is an indication that the repetition rate of the input pulses is higher than the reference rate of the detector 22 and when no pulses appear at the output terminal 114 it is an indication that the input pulses occur at a rate below the reference rate.

In considering the combined response of the low limit detector 20 and the high limit detector 22 to a given input signal, it will be understood from the foregoing description that when the input signal is of a frequency or pulse repetition rate falling between the high and low limits set by the two detectors no output pulses will appear at either of the output terminals 73 or 114. On the other hand, if the input signal has a frequency or pulse repetition rate falling either above or below the band established by the high and low limits then output pulses will appear on either the output terminal 73 or the output terminal 114 depending on whether the exact frequency is below the low limit or above the high limit. As an example and as previously mentioned, assume that the low limit detector 20 has a reference rate of 10 pulses per second and that the high limit detector 22 has a reference rate of 12 pulses per second. Then, if the input waveform 34 has a frequency of 11 cycles per second no output pulses will occur at either of the output terminals 73 and 114 or at the output of the amplifier 28, the two terminals 73 and 114 being connected to the amplifier as inputs thereto with the amplifier acting as an OR gate. If the input signal 34 has a frequency of 9 cycles per second then output pulses will occur at the terminal 73 and at the output of the amplifier 28. Likewise, if the input signal 34 has a frequency of 13 cycles per second output pulses will appear at the terminal 114 and also at the output of amplifier 28. More particularly, no output pulses will appear from the amplifier 28 when the input frequency is between 10.0 and 12.0 cycles per second, and output pulses will be produced whenever the input frequency is outside of such frequency band.

The output of the amplifier 28 may be used directly as a signal representing whether or not the input frequency falls within or without the frequency band but preferably a means such as the set or automatic one circuit 24 and the output flip-flop 26 is used to produce a steady-state DC output signal which is maintained at one level or another for so long as the input signal remains within or without the frequency band.

Considering the set unit 24, this device is a third timing means and in the illustrated case is exactly similar to the basic detector 20 as to the arrangement and connection of its components, and therefore such components have been given the same reference numbers as in the case of the detector 20 except for being double primed, and need not be further described in detail. The values of the components are however such that the reference repetition rate of the set unit 24 is less than the reference rate of the detector 20 and preferably slightly less than one-half the reference rate of the detector 20. The output terminal 73" of the reset unit 24 is connected to the set terminal of the output flip-flop 26 through the line 116 and the set terminal of the flip-flop is in turn directly connected to the output of the amplifier 28 through a line 118.

In considering the operation of the set unit 24 and output flip-flop 26, assume first that the input signal 34 has a frequency falling within the frequency band established by the detectors 20 and 22 so that no output pulses appear at the output of the amplifier 28. Therefore, no pulses are supplied to the input terminal 84" of the set unit 24 and accordingly its timing capacitor 44" periodically triggers the unijunction transistor 52" to produce output pulses at the output terminal 73".

The first of these pulses switches the output flip-flop 26 to its set condition to produce one value of output signal on its output line 120, and as no other pulses appear on the reset line 118 the flip-flop 26 remains in this condition for so long as the frequency of the input signal 34 remains within the frequency band. Assume now, however that the input signal 34 disappears or that its frequency shifts and falls outside of the frequency band, so that pulses are produced from the output of the amplifier 28. The first of these pulses is immediately transmitted through the reset line 118 to the output flip-flop 26 to reset it to a reset condition and produce another value of output on its output line 120. The output pulses from the amplifier 28 are also fed to the set unit 24, but these pulses occur at a rate greater than the reference rate of the set unit 24 so that no output is produced at the output terminal 73" of the set unit, and accordingly the output flip-flop 26 is not set and remains in its reset condition for so long as the input signal frequency falls outside of the frequency band. When the input signal 34 again switches back to a frequency falling within the frequency band the amplifier 28 ceases to produce output pulses and therefore after the running of the timing interval of the unit 24 an output pulse is produced on the line 116 which sets the flip-flop 26 to its set condition and produces a signal on the line 120 indicating that the input is of a frequency falling within the frequency band. Depending on the length of the timing interval of the unit 24, the input signal may have to go through a number of cycles or pulses of in-band frequency before the unit times-out by the capacitor 44" being charged to the triggering value, and accordingly by proper selection of its timing interval the set unit may be used to assure that no in-band signal appears on the line 120 until after the input signal 34 has persisted at an in-band frequency for a predetermined number of cycles.

It should be noted that if a continuous input signal 34 of a frequency less than the reference rate of the low limit detector 20 is received it may happen that occasionally an input pulse 32 will be supplied to the transistor 78 of the detector 20 at the exact instant that the unijunction transistor 52 should fire, with the result that no output signal is produced from the unijunction transistor or at the output terminal 73. This nonproduction of an output signal cannot, however, occur more than once during a time interval equal to two periods of the low limit reference rate. Accordingly, adjusting the reference rate of the set unit 24 so that it is less than one-half of the reference rate of the low limit detector 20 assures that no set signal will be produced at the output terminal 73" of the set unit 24 when and if an output pulse fails to appear at the output terminal 73 of the low limit detector 20, as a result of the transistor 78 of the latter unit being switched simultaneously with the firing of the associated unijunction transistor 52.

I claim:

1. An electrical device for determining whether a plurality of input pulses occur at a repetition rate above or below a given reference rate and for producing an output signal representative of the determination made thereby, said device comprising a capacitor, a voltage source, a charging circuit including a resistance connected in series with said capacitor across said voltage source for charging said capacitor, a detecting circuit connected with said capacitor for producing an output signal when the voltage across said capacitor reaches a predetermined value, the values of said capacitor, said voltage source and said resistance being such that said capacitor is charged from a discharged condition to said predetermined voltage during a period equal to the period between pulses occurring at said reference rate of repetition, an input terminal, a gated discharge circuit connected across said capacitor and responsive to input pulses applied to said input terminal for discharging said capacitor to said discharged condition during the appearance of each of said input pulses and for permitting said capacitor to charge during the period between successive ones of said input pulses, and means connected with said input terminal for converting an input signal of cyclical waveform into input pulses such as aforesaid which input pulses are applied to said input terminal and occur at a rate equal to the frequency of said input signal.

2. An electrical device as defined in claim 1 further characterized by said gated discharge circuit including a transistor having a base terminal and two main terminals, means connecting one of said main terminals to one side of said capacitor, a diode, means connecting the other of said main terminals of said transistor to the other side of said capacitor through said diode, and means for applying said input pulses to said base terminal of said transistor.

3. An electrical device for determining whether a plurality of input pulses occur at a repetition rate above or below a given reference rate and for producing an output signal representative of the determination made thereby, said device comprising a capacitor, a voltage source, a charging circuit including a resistance connected in series with said capacitor across said voltage source for charging said capacitor, a detecting circuit connected with said capacitor including means for producing an output pulse when the voltage across said capacitor reaches a predetermined value, the value of said capacitor, said voltage source and said resistance being such that said capacitor is charged from a discharged condition to said predetermined voltage during a period equal to the period between pulses occurring at said reference rate of repetition, an input terminal, and a gated discharge circuit connected across said capacitor and responsive to input pulses applied to said input terminal for discharging said capacitor to said discharged condition during the appearance of each of said input pulses and for permitting said capacitor to charge during the period between successive ones of said input pulses.

4. An electrical device as defined in claim 3 further characterized by said detecting circuit including a unijunction transistor connected with said capacitor so as to be triggered to a conducting state and provide a discharge circuit for said capacitor when the voltage across said capacitor reaches said predetermined voltage.

5. An electrical device as defined in claim 4 further characterized by said unijunction transistor having its emitter terminal connected to one side of said capacitor and having one of its base terminals connected to the other side of said capacitor through a resistor.

6. An electrical device as defined in claim 4 further characterized by said unijunction transistor having its emitter terminal connected to the junction of said capacitor and said charging circuit resistance, said unijunction transistor further having one of its base terminals connected to one side of said voltage source through a first resistance and having the other of its base terminals connected to the other side of said voltage source through a second resistance.

7. An electrical device as defined in claim 3 further characterized by said detecting circuit including a unijunction transistor having its emitter terminal connected to the junction of said capacitor and said charging circuit resistance, said unijunction transistor having one of its base terminals connected to one side of said voltage source through a first resistance and having the other of its base terminals connected to the other side of said voltage source through a second resistance, said gated discharge circuit including a transistor having emitter, collector and base terminals, said transistor having its emitter terminal connected to said one side of said capacitor and having its collector terminal connected to the other side of said capacitor through a diode, a resistor connected between said collector terminal and said other side of said supply voltage and means for applying said input pulses to the base terminal of said transistor.

8. An electrical device as defined in claim 3 further characterized by means connected with said detecting circuit for producing an output pulse whenever no output pulse is produced by said detecting circuit during the interval between two successive ones of said input pulses.

9. An electrical device as defined in claim 8 further characterized by said pulse producing means comprising a flip-flop connected with said detecting circuit and arranged to be reset to zero condition by an output pulse from said detecting circuit, means for transmitting said input pulses to said flip-flop for setting said flip-flop to its other condition in response to such input pulses, and a NAND gate circuit having as inputs thereto said input pulses and the output of said flip-flop and adapted to produce output pulses occurring simultaneously with said input pulses only when said flip-flop is in its set condition at the time of the occurrence of said input pulses.

10. An electrical device for determining whether a plurality of input pulses occur at a repetition rate falling within or without a given band of repetition rates and for producing an output signal representative of the determination made thereby, said device comprising an input terminal to which input pulses such as aforesaid are applied, a low limit detector directly connected to said input terminal, said low limit detector being responsive to input pulses supplied thereto from said input terminal and including means for producing output pulses when said input pulses occur at a rate falling on one side of the low limit of said band and for producing no output pulses when said input pulses occur at a rate falling on the other side of said low limit of said band, a high limit detector also directly connected to said input terminal, said high limit detector being responsive to input pulses supplied thereto from said input terminal and including means for producing output pulses when said input pulses occur at a rate falling on one side of the high limit of said band and for producing no pulses when said input pulses occur at a rate falling on the other side of said high limit of said band, and a logic gate having as inputs thereto the outputs of said low and high limit detectors.

11. An electrical device as defined in claim 10 further characterized by said means of said low limit detector comprising means for producing output pulses when said input pulses occur at a rate below the low limit of said band and for producing no output pulses when said input pulses occur at a rate above the low limit of said band, and said means of said high limit detector comprising means for producing output pulses when said input pulses occur at a rate above the high limit of said band and for producing no pulses when said input pulses occur at a rate below said high limit of said band.

12. An electrical device as defined in claim 10 further characterized by at least one of said detectors comprising a capacitor, a voltage source, a charging circuit including a resistance connected in series with said capacitor across said voltage source for charging said capacitor, a detecting circuit connected with said capacitor for producing an output signal when the voltage across said capacitor reaches a predetermined value, the values of said capacitor, said voltage source and said resistance being such that said capacitor is charged from a discharged condition to said predetermined voltage during a period equal to the period between pulses occurring at a rate of repetition equal to an associated one of the limit rates of said band, and a gated discharge circuit connected across said capacitor and responsive to said input pulses for discharging said capacitor to said discharged condition during the appearance of each of said input pulses.

13. An electrical device as defined in claim 12 further characterized by said detecting circuit including means for producing an output voltage pulse when the voltage across said capacitor reaches said predetermined value.

14. An electrical device as defined in claim 13 further characterized by said detecting circuit including a unijunction transistor connected with said capacitor so as to be triggered to a conducting state and provide a discharge circuit for said capacitor when the voltage across said capacitor reaches said predetermined voltage.

15. An electrical device as defined in claim 10 further characterized by at least one of said detectors comprising a capacitor, a voltage source, a charging circuit including a resistance connected in series with said capacitor across said voltage source for charging in said capacitor, a detecting circuit including a unijunction transistor connected with said capacitor so as to be triggered to a conducting state and provide a discharge circuit for said capacitor when the voltage across said capacitor reaches said predetermined value, means for producing an output voltage pulse in response to the triggering of said unijunction transistor, the values of said capacitor, said voltage source and said resistance being such that said capacitor is charged from a discharged condition to said predetermined voltage during a period equal to the period between pulses occurring at a rate of repetition equal to an associated one of the limit rates of said band, a gated discharge circuit connected across said capacitor and responsive to said input pulses for discharging said capacitor to said discharged condition during the appearance of each of said input pulses, a flip-flop connected with said detecting circuit and arranged to be reset to zero condition by an output pulse from said detecting circuit, means for transmitting said input pulses to said flip-flop for setting said flip-flop to its other condition in response to the trailing edge of such input pulse, and an NAND gate circuit having as inputs thereto said input pulses and the output of said flip-flop for producing output pulses occurring simultaneously with said input pulses only when said flip-flop is in its set condition at the time of the occurrence of said input pulses, the output of said NAND gate constituting the output which is transmitted to said NOR gate.

16. A device as defined in claim 10 further characterized by an output flip-flop having set and reset terminals, means directly connecting the reset terminal of said output flip-flop to the output of said NOR gate, and a set unit connected between said output of said NOR gate and said set terminal of said output flip-flop, said set unit including means for producing output pulses transmitted to said set terminal of said output flip-flop when no pulses appear at the output of said NOR gate and for producing no pulses for transmission to said set terminal of said output flip-flop when pulses do occur at the output terminal of said NOR gate.

17. An electrical device as defined in claim 16 further characterized by said set unit comprising a capacitor, a voltage source, a charging circuit including a resistance connected in series with said capacitor across said voltage source for charging said capacitor, a detecting circuit connected with said capacitor for producing an output signal whenever the voltage across said capacitor reaches a predetermined value, said detecting circuit including a unijunction transistor connected with said capacitor so as to be triggered to a conducting state and provide a discharge circuit for said capacitor when the voltage across said capacitor reaches said predetermined voltage, and means for producing an output pulse in response to the triggering of said unijunction transistor, the values of said capacitor, said voltage source and said resistance being such that said capacitor is charged from a discharged condition to said predetermined voltage during a period longer than the period between pulses occurring at said low limit rate, and a gated discharge circuit connected across said capacitor and responsive to pulses received from said NOR gate for discharging said capacitor to said discharged condition during the receipt of each of said latter pulses from said NOR gate.

18. An electrical device for determining whether a plurality of input pulses occur at a repetition rate above or below a given reference rate and for producing an output signal representative of the determination made thereby, said device comprising a timing means having a predetermined timing interval and being operable to reset itself to an initial condition with regard to said timing interval and to produce an output signal upon the running of said timing interval, said timing means having an input terminal and being adapted to run when no input pulse appears at said input terminal, and means responsive to the appearance of an input pulse at said input terminal for resetting said timing means to said initial condition.

19. An electrical device as defined in claim 18 further characterized by a means connected with said input terminal for converting an input signal of cyclical waveform into input pulses such as aforesaid which input pulses are applied to said input terminal and which occur at a rate equal to the frequency of said input signal.

20. An electrical device as defined in claim 18 further characterized by said timing means having an output terminal and being operable to produce an output voltage pulse at said output terminal upon the running of said timing interval, and means connected with said output terminal of said timing means and having its own output terminal for producing an output pulse at said latter output terminal whenever no output pulse appears at said output terminal of said timing means during the interval between two successive ones of said input pulses.

21. In an electrical device for determining whether a plurality of input pulses occur at a repetition rate falling within or without a given band of repetition rates, the combination comprising an input terminal, a first timing means having a first predetermined timing interval and operable to produce a first output signal upon the running of said first timing interval, said first timing means being connected with said input terminal and being adapted to run when no input pulse appears at said input terminal, a second timing means having a second predetermined timing interval different from said first timing interval and operable to produce a second output signal upon the running of said second timing interval, said second timing means also being connected with said input terminal and being adapted to run when no input pulse appears at said input terminal, and means for resetting both said first and said second timing means to initial conditions to start new timing cycles in response to the appearance of a pulse at said input terminal.

22. A combination defined in claim 21 further characterized by means connected with said first timing means for producing a third output signal whenever no first output signal is produced by said first timing means during a interval between two successive ones of said input pulses, a logic gate having two input terminals and means for transmitting said second output signal and said third output signal respectively to said logic gate as inputs thereto.

23. The combination defined in claim 22 further characterized by said logic gate having an output terminal and being operable to produce a fourth output signal at its said output terminal in response to the appearance at either of its two said input terminals of either said second or said third output signals, a third timing means connected with said output terminal of said logic gate having a third predetermined timing interval and operable to produce a fifth output signal upon the running of said third timing interval, said third timing means being adapted to run when said fifth output signal is absent from said output terminal of said logic gate, and means for resetting said third timing means to an initial condition to start a new timing interval in response to the appearance of said fifth output signal at said output terminal of said logic gate.

24. The combination defined in claim 23 further characterized by said third timing means having an output terminal at which said fifth output signal appears, a flip-flop having a set terminal and a reset terminal, means connecting said output terminal of said logic gate to the said set terminal of said flip-flop so that said flip-flop is set by said fourth output signal, and means connecting said output terminal of said third timing means to said flip-flop so that said flip-flop is reset by said fifth output signal.

25. The combination defined in claim 24 further characterized by said first, second and third timing means, said means connected with said first timing means for producing a third output signal, and said logic gate being so constructed that all of said first, second, third, fourth and fifth output signals are in the form of voltage pulses.

26. A method for determining whether a plurality of input voltage pulses occur at a repetition rate above or below a given reference rate and for producing an output representative of the determination, said method comprising the steps of providing a voltage source, providing a capacitor charging circuit including a capacitor and resistance connected in series with one another and which capacitor when said charging circuit is connected across said voltage source charges from a discharged state to a predetermined voltage in a time interval equal to the time interval existing between input voltage pulses occuring at said reference rate, applying a plurality of input voltage pulses to an input terminal, discharging said capacitor in response to the appearance of each of said input voltage pulses at said input terminal, applying said voltage source to said charging circuit to charge said capacitor immediately after the disappearance of each of said input pulses from said input terminal, detecting the voltage appearing across said capacitor, producing an output signal when said detected voltage reaches said predetermined voltage, and utilizing the appearance of said output signal as an indication that said plurality of input pulses has a repetition rate lower than said reference rate and the nonappearance of said output signal as an indication that said plurality of input pulses has a repetition rate greater than said reference rate.

27. A method for determining whether a plurality of input voltage pulses occur at a repetition rate above or below a given reference rate and for producing an output signal representative of the determination, said method comprising the steps of providing a timing means having a predetermined timing interval equal to the time interval existing between input voltage pulses occuring at said reference rate, applying a plurality of voltage pulses to an input terminal, resetting said timing means to an initial condition with regard to its timing interval in response to the appearance of each of said input voltage pulses at said input terminal, starting said timing means to run said timing interval immediately following the disappearance of each of said input pulses from said input terminal, providing an output signal whenever said timing means completes the running of said timing interval, and utilizing the appearance of said output signal as an indication that said plurality of input pulses has a repetition rate lower than said reference rate and the nonappearance of said output signal as an indication that said plurality of input pulses has a repetition rate greater than said reference rate.

28. A method for determining whether a plurality of input voltage pulses occur at a repetition rate falling within or without a given band of repetition rates and for producing an output signal representative of the determination, said method comprising the steps of providing a first timing means having a predetermined timing interval equal to the time interval existing between input pulses occuring at the rate constituting the lower limit of said given band, providing a second timing means having a predetermined timing interval equal to the time interval existing between input voltage pulses occuring at the rate constituting the higher limit of said given band, applying a plurality of voltage pulses to an input terminal, simultaneously resetting both of said timing means to initial conditions with regard to their timing intervals in response to the appearance of each of said input voltage pulses at said input terminal, producing a first output signal whenever said first timing means completes the running of its timing interval, providing a second output signal whenever said second timing means completes the running of its timing interval, and utilizing the appearance and nonappearance of said first and second output signals as an indication of whether said input pulses applied to said input terminal occur at a repetition rate falling within or without said given band.